United States Patent
Kawabata et al.

(10) Patent No.: US 6,892,223 B1
(45) Date of Patent: May 10, 2005

(54) SYSTEM AND METHOD OF DISPLAYING INFORMATION ON DESKTOP

(75) Inventors: Kazuo Kawabata, Tokyo (JP); Junya Tsutsumi, Tokyo (JP); Takuya Ogihara, Tokyo (JP); Kenichi Mogi, Tokyo (JP); Tomohiko Furumoto, Tokyo (JP)

(73) Assignee: Bandai Co., Ltd., Tokyo (JP)

( * ) Notice: Subject to any disclaimer, the term of this patent is extended or adjusted under 35 U.S.C. 154(b) by 0 days.

(21) Appl. No.: 09/463,308
(22) PCT Filed: May 21, 1999
(86) PCT No.: PCT/JP99/02684
  § 371 (c)(1),
  (2), (4) Date: Feb. 28, 2000
(87) PCT Pub. No.: WO99/61995
  PCT Pub. Date: Dec. 2, 1999

(30) Foreign Application Priority Data
  May 22, 1998 (JP) .......................................... 10-140751

(51) Int. Cl.[7] .......................... G06F 15/167; G06F 15/16
(52) U.S. Cl. .......................... 709/213; 709/228; 345/706
(58) Field of Search ................................ 709/213, 245, 709/228; 715/501.1; 345/706, 747

(56) References Cited

U.S. PATENT DOCUMENTS 5,740,549 A * 4/1998 Reilly et al. .................. 705/14
5,880,731 A * 3/1999 Liles et al. ................... 345/758
5,948,061 A * 9/1999 Merriman et al. .......... 709/219
5,973,692 A * 10/1999 Knowlton et al. .......... 345/835
5,995,102 A * 11/1999 Rosen et al. ................. 345/856
6,049,342 A * 4/2000 Nielsen et al. ............... 345/473
6,119,135 A * 9/2000 Helfman ...................... 715/513
6,449,638 B1 * 9/2002 Wecker et al. .............. 709/217
6,636,219 B2 * 10/2003 Merrick et al. ............. 345/473

OTHER PUBLICATIONS

Dedrick, R., "Interactive electronic advertising", IEEE Intern. Workshop on Community Networking Integrated Multimedia Service to the Home, pp. 55–66, Jul. 1994.*
Manske, K. et al., "Comic actors representing software agents", IEEE Multimedia Modeling, pp. 213–222, Oct. 1998.*
Filman Robert,"Still not bleeding", IEEE Internet Computing, p 80–81, Oct. 1998.*

* cited by examiner

Primary Examiner—Jason D. Cardone
(74) Attorney, Agent, or Firm—Sughrue Mion, PLLC

(57) ABSTRACT

A terminal and first, second and third servers are connected through a communication circuit. The first server stores a list of data of obtainable characters and a server address of character display data. The second server stores character display data and a schedule file. The third server stores advertisement data. The terminal down-loads the list from the first server and displays the list of obtainable characters. By selecting an arbitrary character from the list, the terminal down-loads an address of stored character display data from the second server. Based on the address, character display data and a corresponding schedule file are down-loaded from the second server. Advertisement data is down-loaded from the third server as described in the schedule file. The terminal displays the character on a desktop based on the character display data, and provides an advertisement from the advertisement data according to a schedule described in the schedule file.

33 Claims, 13 Drawing Sheets

FIG.4

FORMAT OF SCHEDULE FILE

1. DESIGNATION UNDER DEFAULT CONDITION OF CHARACTER
   (WHEN INFORMATION IS NOT DISPLAYED)

---
1. DEFINITION OF <DEFAULT>
  2. EFFECTIVE TERM OF CHARACTER
     (EXCEPT THIS TERM, THE CHARACTER IS NOT DISPLAYED.)
        1998/08/05/00:00, 1998/12/08/00:00
  3. URL DESIGNATION OF CHARACTER ID AND MCT FILE
     (102 MEANS CHARACTER ID.)
        102, http://charapush.channel.or.jp/^furu/channel/oyaji/oyaji.mct
  4. URL TO WHICH STATUS JUMPS WHEN CHARACTER IS DOUBLE-CLICKED
        U,http://charapush.channel.or.jp
---

2. DESIGNATION OF CONDITION WHEN CHARACTER SENDS INFORMATION

---
1. DEFINITION OF INFORMATION DISPLAY
  2. START TIME AND END TIME OF BLOWING DISPLAY
        (1998/09/24/08:00, 1998/09/24/08:01)
  3. DESIGNATION ASSOCIATED WITH AN INFORMATION TEXT
     T, http://charapush.channel.or.jp/^furu/ad/bandai/text/oyaji/t19980805/0003.text,103,
     -79,0,0,150,0,0,0,255,255,255
     T MEANS A TEXT.   Http~0003.text IS URL DESIGNATION OF A TEXT.
     103,-79,: POSITION OF A TEXT MESSAGE (PIXELS FROM A STEP OF A CHARACTER)
     0,0,: NOT USED   150,: LONGITUDINAL SIZE OF A TEXT MESSAGE
     0,0,0,: COLOR OF A TEXT
     255,255,255,: BACKGROUND COLOR OF A TEXT
  4. URL OF AN IMAGE OF BLOWING AND SO FORTH AND DISPLAY POSITION
     P,http://charapush.channel.or.jp/^furu/ad/bandai/pict/oyaji/1.bmp,70,-104
     P MEANS A BLOWING IMAGE. Http~1.bmp, IS URL OF A BMP FILE USED FOR BLOWING
     70,-104: POSITION OF A BLOWING IMAGE
  5. DESIGNATION OF ACTIONS WHEN REPRODUCING AN IMAGE (BY A NUMBER) A,100
  6. URL TO WHICH STATUS JUMPS WHEN CHARACTER IS DOUBLE-CLICKED
       DURING AN INFORMATION DISPLAY
           U,http://www2.channel.or.jp/cgi-bin/bfind.cgi?number=000641
---

SYSTEM AND METHOD OF DISPLAYING INFORMATION ON DESKTOP

FIELD OF THE INVENTION

The present invention relates to information providing technology, and especially to technology for providing an advertisement on an image plane (desktop) of a computer.

BACKGROUND OF THE INVENTION

In recent years, in connection with prosperity of an internet, there is a trend that the internet is utilized as means for providing an advertisement. For example, a home page of an enterprise and an internet television set are example thereof.

However, with regard to all of the conventional means, unless a user actively takes action, it is not possible for the user to see information such as an advertisement and obtain information such as an advertisement. For example, in case of seeing a home page of an enterprise, it is possible for a user to open a home page of a predetermined enterprise and see information described in the home page till the user starts up a browser and inputs an address of the home page. Also, for a side which provides advertisement information of an enterprise and so forth, it is not possible to directly and passively show a user the latest advertisement such as an advertisement through a television.

On the other hand, there was technology in which a character a user likes is shown on an image plane (desktop) of a computer.

However, even in case of showing the character on the image plane (desktop), it takes a lot of loads and costs to obtain a display data of the character to be shown on the image plane.

Accordingly, the present invention has an objective to provide technology of an information offer, which is capable of automatically showing a character especially on an image plane (desktop) of a computer, and of showing advertisement information on the image plane (desktop) of the computer, which an advertisement provider wants to show, using the character that has been shown.

Also, the present invention has an objective to provide technology of an information offer, which is capable of updating advertisement information to be shown on an image plane (desktop) of a computer to the latest advertisement information.

SUMMARY OF THE INVENTION

The above-described objective of the present invention is accomplished by an information providing system having a first server, a second server, a third server, a terminal, and a communication circuit connecting each of the above-described servers with the terminal, characterized in that the above-described first server has storage means for storing a list of data of characters which a user can obtain, and a server address at which a character display data for displaying the above-described characters is stored, and means for conducting communication with each other through the above-described terminal and the above-described communication circuit, the above-described second server has storage means for storing the above-described character display data and a schedule file for managing information in relation to the characters, and means for conducting communication with each other through the above-described terminal and the above-described communication circuit, the above-described third server has storage means for storing a data of information in relation to the above-described characters, and means for conducting communication with each other through the above-described terminal and the above-described communication circuit, and the above-described terminal has means for communicating with the above-described first server, second server and third server, means for down-loading the above-described list of data from the above-described first server and displaying a list of the characters that can be obtained, means for down-loading an address of the second server in which the character display data of a character selected from the above-described first server is stored by selecting an arbitrary character from the above-described list of the characters, means for down-loading the above-described character display data and the schedule file corresponding to these characters from the above-described second server, based on the address of the above-described second server, means for down-loading an information data described in the above-described schedule file from the above-described third server, means for displaying characters on a desktop based on the down-loaded character display data, and means for providing information by means of the down-loaded information data based on a schedule described in the above-described schedule file.

Also, the above-described objective of the present invention is accomplished by an information providing system having a first server, a second server, a third server, a terminal, and a communication circuit connecting each of the above-described servers with the terminal, characterized in that the above-described first server has storage means for storing a list of data of characters which a user can obtain, and a server address at which a character display data for displaying the above-described characters is stored, and means for conducting communication with each other through the above-described terminal and the above-described communication circuit, the above-described second server has storage means for storing the above-described character display data, a schedule file for managing information in relation to the characters, and a data of information in relation to the above-described characters, and means for conducting communication with each other through the above-described terminal and the above-described communication circuit, the above-described terminal has means for communicating with the above-described first server, second server and third server, means for down-loading the above-described list of data from the above-described first server and displaying a list of the characters that can be obtained, means for, by selecting an arbitrary character from the above-described list of the characters, down-loading an address of the second server from the above-described first server, in which the character display data of the selected character is stored, means for down-loading the above-described character display data, the schedule file corresponding to these characters and the data of the information in relation to the above-described characters from the above-described second server, based on the address of the above-described second server, means for displaying characters on a desktop based on the down-loaded character display data, means for providing information of the down-loaded information data based on a schedule described in the above-described schedule file, means for recording information provided in the above-described information, and means for transmitting the above-described provided information record to the above-described third server, and the above-described third server has means for conducting communication with each other through the above-described terminal and the above-described communication circuit, storage means for storing the provided information record, and means for storing the provided information record in the above-described storage means, which has been transmitted, in association with the terminal that transmitted it.

Moreover, the above-described objective of the present invention is accomplished by an information providing method in a network comprising at least a first server, a second server, a third server, a terminal, and a communication circuit connecting each of the above-described servers with the terminal, characterized in that the method has steps of:

storing in the above-described first server a list of data of characters which a user can obtain, and a server address at which a character display data for displaying the above-described characters is stored;

storing in the above-described second server the above-described character display data and a schedule file for managing information in relation to the characters;

storing in the above-described third server a data of information in relation to the above-described characters;

having access to the above-described first server from the above-described terminal, and down-loading the above-described list of data and displaying a list of characters on the terminal;

selecting an arbitrary character from the displayed list, and transmitting a data indicating the selected character to the above-described first server;

receiving the above-described data at the above-described first server, and transmitting an address of the second server in which a character display data of the selected character to the above-described terminal;

down-loading the above-described character display data and the schedule file corresponding to this character from the above-described second server, based on the above-described address at the above-described terminal;

down-loading an information data described in the above-described schedule file from the above-described third server at the above-described terminal;

displaying characters on a desktop based on the down-loaded character display data at the above-described terminal; and providing information of the down-loaded information data based on a schedule described in the above-described schedule file at the above-described terminal.

Also, the above-described objective of the present invention is accomplished by an information providing method in a network comprising at least a first server, a second server, a third server, a terminal, and a communication circuit connecting each of the above-described servers with the terminal, characterized in that the method has steps of: storing in the above-described first server a list of data of characters which a user can obtain, and a server address at which a character display data for displaying the above-described characters is stored;

storing in the above-described second server the above-described character display data, information in relation to the characters and a schedule file for managing information in relation to the above-described characters;

having access to the above-described first server from the above-described terminal, and down-loading a server address at which the above-described list of data and the character display data are stored, and displaying a list of characters on the terminal;

selecting an arbitrary character from the displayed list at the above-described terminal;

recognizing an address of a server corresponding to the above-described selected character at the above-described terminal;

down-loading the character display data of the above-described selected character, the information data in relation to the above-described selected character and the schedule file of the above-described selected character from the above-described second server, based on the above-described server address at the above-described terminal;

displaying characters on a desktop based on the down-loaded character display data at the above-described terminal;

providing information of the information data based on a schedule described in the above-described schedule file at the above-described terminal;

recording the providing of the provided information at the above-described terminal;

transmitting a provided record of the recorded information to the third server at the above-described terminal when communication can be conducted; and creating a database of the record of the provided information of the above-described terminal based on the provided record of the above-described information at the above-described third server.

As a preferable embodiment of the above-described present invention, it is preferable that the above-described information data is an advertisement data for providing an advertisement.

Also, as a preferable embodiment of the above-described present invention, it is preferable that a new schedule file and information data are down-loaded from the above-described second server or third server when communication can be conducted, and the data is updated.

Moreover, as a preferable embodiment of the above-described present invention, it is preferable that an effective term is set for the above-described schedule file, and it is preferably constructed that a display of the characters is disabled in case that the above-described effective term is passed over.

The present invention is information providing technology capable of displaying information such as characters and advertisement on an image plane of a computer, and always updating it to new information.

The updating of the information is basically conducted through a communication network, for example a network such as internet, and a quantity of data to be displayed are stocked on a side of a terminal.

The characters and advertisement information to be displayed on the image plane are down-loaded through the network, and are displayed based on a schedule file. The updating of the schedule file is conducted by automatically having access to a server and conducting downloading by means of a terminal.

Also, log information (user information or utilization frequency) of the terminal is up-loaded on a side of a server, and classified and managed.

Also, it is possible to add applications that become to be different kinds of plugs-in, and also, each plug-in can control the movement and function of the displayed characters.

BRIEF DESCRIPTION OF THE DRAWINGS

FIG. 4 is a view for explaining a schedule file.

BEST MODE FOR CARRYING OUT THE INVENTION

An embodiment of the present invention will be explained. First, terms used in this embodiment will be explained.

1. Character

A character means a person or an object made of a polygon, for example, and means an object to be displayed on a desktop of a user. This character freely moves around on an image plane (desktop) of a computer, and conducts various actions.

A data for displaying this character is comprised of an EXE file that is an application file for combining data with each other and displaying and operating them on the desktop, a file for designating correspondence of necessary files, a file that is a model data of a character, a file that is an action data of a character, a file including a bit map data or a JPEG data and so forth which is a texture data of a character, a file of a voice data, and a motor file for defining a motion of a character on the desktop. The data of these files is generally called a character display data, hereinafter.

2. Advertisement Data

An advertisement data means a data for displaying an advertisement which an advertiser wants to show a user. However, not only a pure advertisement but also an inquiry of a questionnaire and so forth to a user are included in the advertisement mentioned here.

Also, the kind of the advertisement data is not limited to that of a text data, a picture data and a sound data and so forth.

3. Schedule File

A schedule file means a file for managing a schedule of timing and so forth when an advertisement and so forth are displayed on a display of a user. Also, the file manages an effective term during when a character can be displayed.

4. Tuner

A tuner means a program which is first installed in a terminal device of a user. This program has a function for transmitting and receiving a character display data, a schedule file and an advertisement data, and displaying a character and an advertisement. However, as a method of obtaining the tuner, purchase, distribution and download from a server or internet and so forth can be considered.

Next, a particular embodiment will be explained.

Figure 1:
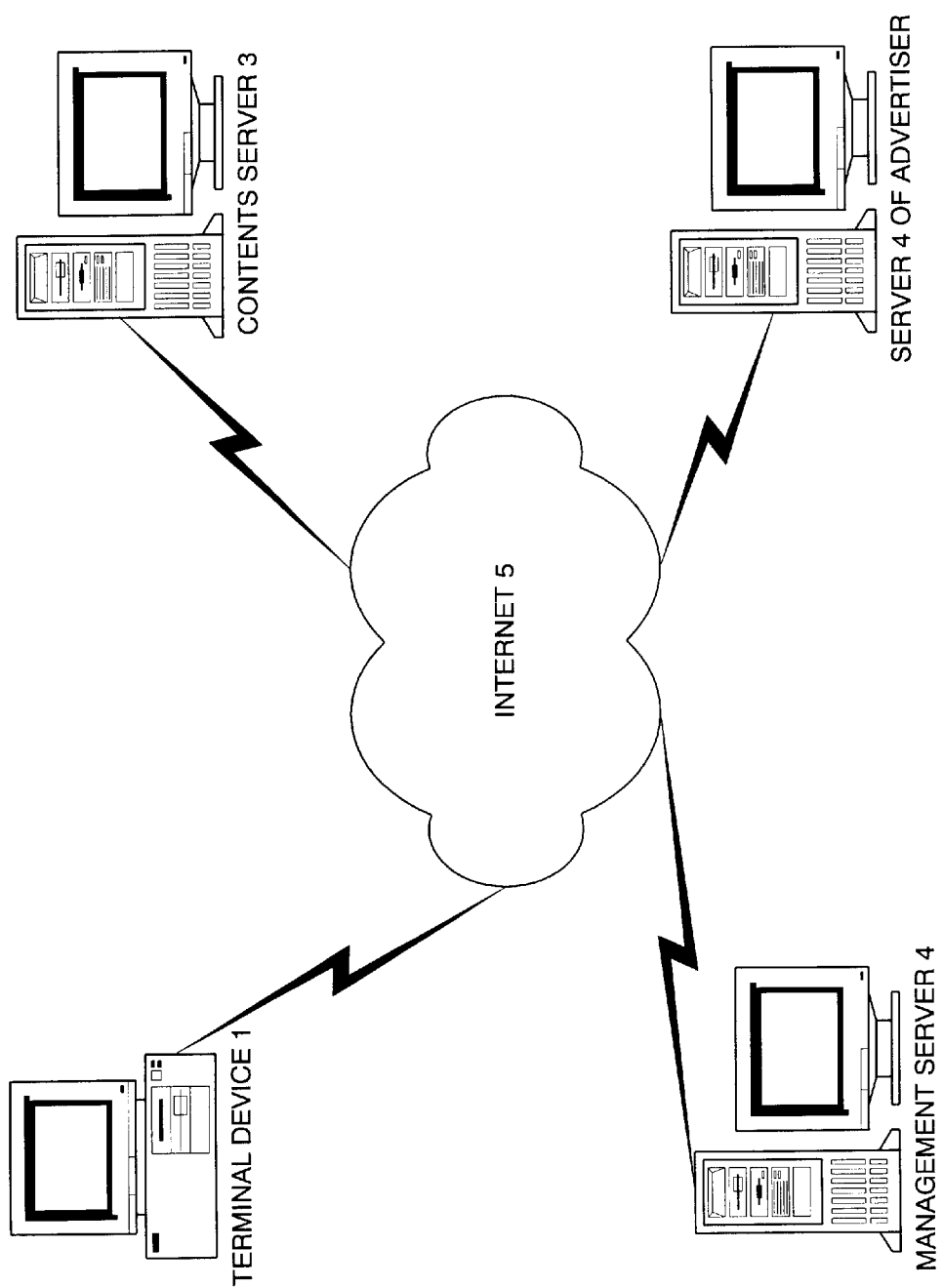
FIG. 1 is a conceptual view of this embodiment.

FIG. 1 is a conceptual view of this embodiment.

In FIG. 1, 1 is a terminal device of a user. This terminal device 1 is a computer, and is constructed of a computer body, a display, a communication modem, a keyboard, a mouse and so forth. Also, in a storage device of the terminal device 1, a tuner is installed.

2 is a management server. This only one management server 2 exists on a network, and manages characters which are presently registered and can be obtained by a user. For example, when a user starts up a tuner and has access to the management server 2, the management server 2 transmits a list of data of the characters which are presently registered and can be obtained by the user. In the terminal device 1 of the user, by means of the list of the data, a list of the characters which can be obtained is displayed, and it is possible to select a desired character out of this list. When the user selects the desired character, the management server 2 transmits an address of a contents server, which corresponds to the selected character, to the terminal device 1. Accordingly, in order to know an address of the contents server in which the character which can be obtained and the character display data of this character are stored, it is necessary for a user to certainly have access to the management server 2 from the terminal device 1 one time.

3 is a contents server. With regard to this contents server 3, a plurality of contents servers are usually provided, and store a character display data of a character being managed and a schedule file corresponding to the above-described character, respectively. Also, by means of the tuner, these data are transmitted to a person who is trying to obtain the character. Actually, when a user starts up the tuner during an on-line, the user has access to the contents server 3 at an address which has been obtained from the management server 2, and the character display data and the schedule file are down-loaded.

4 is a server of an advertiser. Also, with regard to this server 4, a plurality of servers are provided, and each server stores an advertisement data for displaying (offering) an advertisement, and transmits the advertisement data to the terminal device 1. Actually, based on the tuner and the schedule file which are stored, the advertisement data is down-loaded to the terminal device 1.

5 is an internet, and the terminal device 1, the management server 2, the contents server 3 and the server 4 of an advertiser are connected thereto, and it becomes to be possible to conduct transmission and reception of a data therebetween.

Next, particular operation of the above-mentioned arrangement will be explained.

Operation until a character is displayed on a desktop of the terminal device 1 will be explained using a flowchart of FIG. 2. It is noted that, in the tuner which is installed in the terminal device 1, an address of the management server 2 is previously described.

First, the tuner is started up, and access to the management server 2 from the terminal device 1 is made (Step 100). And, from the management server 2, a list of data of characters which are presently registered is down-loaded (Step 101). In the terminal device 1 which has received it, the list of the characters is displayed (Step 102). A user selects a desired character out of the displayed list (Step 103). Then, an address of the contents server 3 which corresponds to the selected character is down-loaded from the management server 2 (Step 104), and this address is stored in a storage device of the terminal device 1 (Step 105).

Next, based on the address of the contents server 3 which has been obtained from the management server 2, access to the contents server is made (Step 106). And, a character display data of the selected character and a schedule file corresponding to this are down-loaded from the contents server 3, and are stored in the storage device of the terminal device 1 (Step 107).

Successively, the tuner of the terminal device 1 has access to the advertisement server 4 based on an address of the advertisement server, which is described in the schedule file (Step 108). And, an advertisement data described in the schedule file, which is necessary for updating, is down-loaded, and these data are stored (Step 109).

Figure 3:
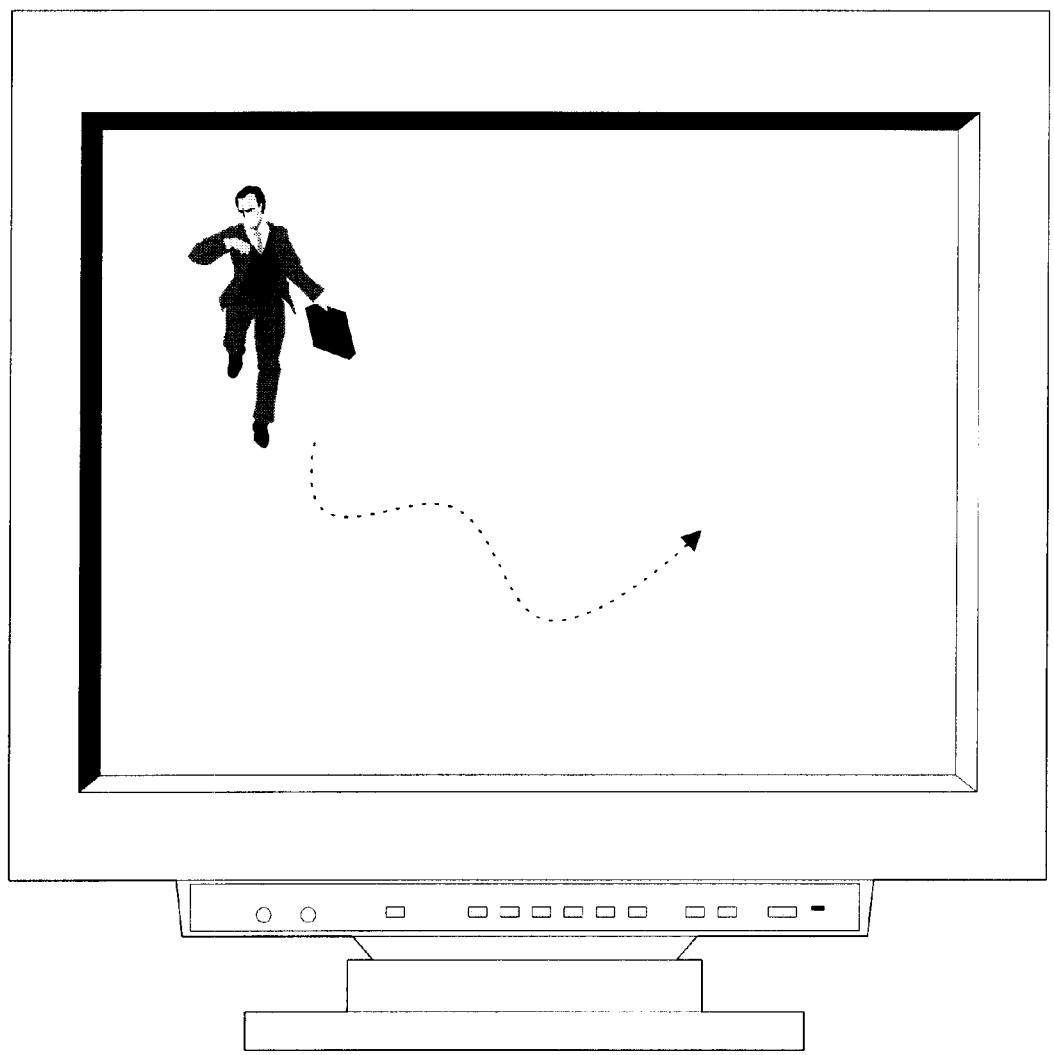
FIG. 3 is a view for explaining an image plane of a desktop on which a character is displayed.

When the tuner confirms the end of the above-described work, as shown in FIG. 3, the selected desired character is displayed on a display of the terminal device of a user (Step 110).

Next, operation of a display of an advertisement in the terminal device 1 will be explained.

First, the schedule file used in this operation will be explained.

The schedule file has a format shown in FIG. 4.

In this example, first, designation of default condition of a character is described (FIG. 4-1). In a block of this default, an effective term of a character (equal to contents) is designated, and in the next line, an address at which ID numbers and character display data uniquely provided for each character are stored is designated, and a URL for starting up a browser when a character is double-clicked under condition that information is not displayed, and displaying the character is designated.

Figure 2:
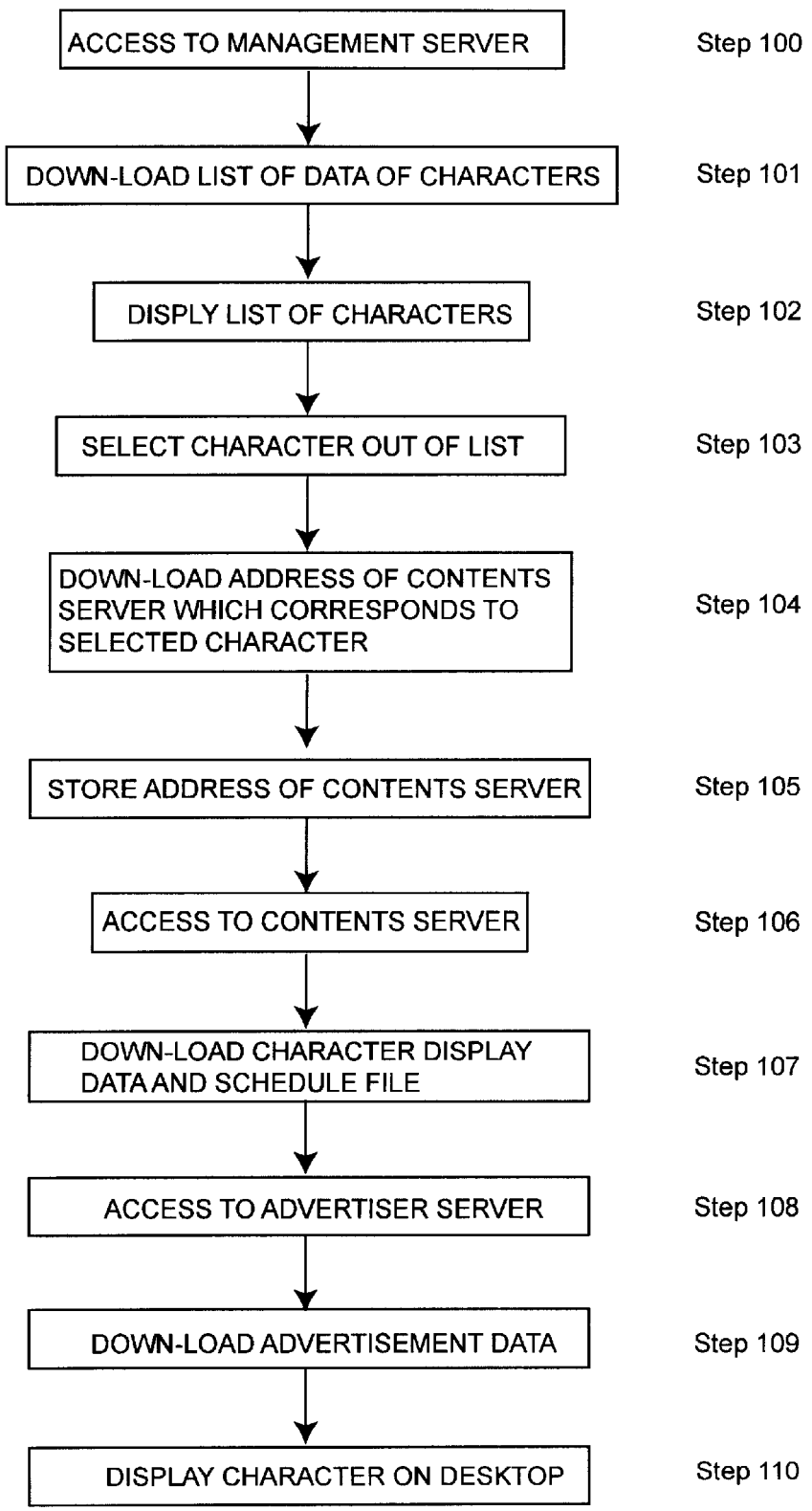
FIG. 2 is a flowchart for explaining operation of this embodiment.

Next, a contents block for designating condition when a character sends information is described (FIG. 4-2). In this block, time of start and end of a display of information (blowing display, in this example), and a type of information (text and so forth, for example) are described. It is noted that, in a URL which is described in an information description block, a file in which an advertisement data is stored exists. Also, an effective term for the schedule file is end time of final contents described in a contents description block.

The tuner displays contents (advertisement) on a display of the terminal device of a user in accordance with a description of this schedule file.

Figure 5:
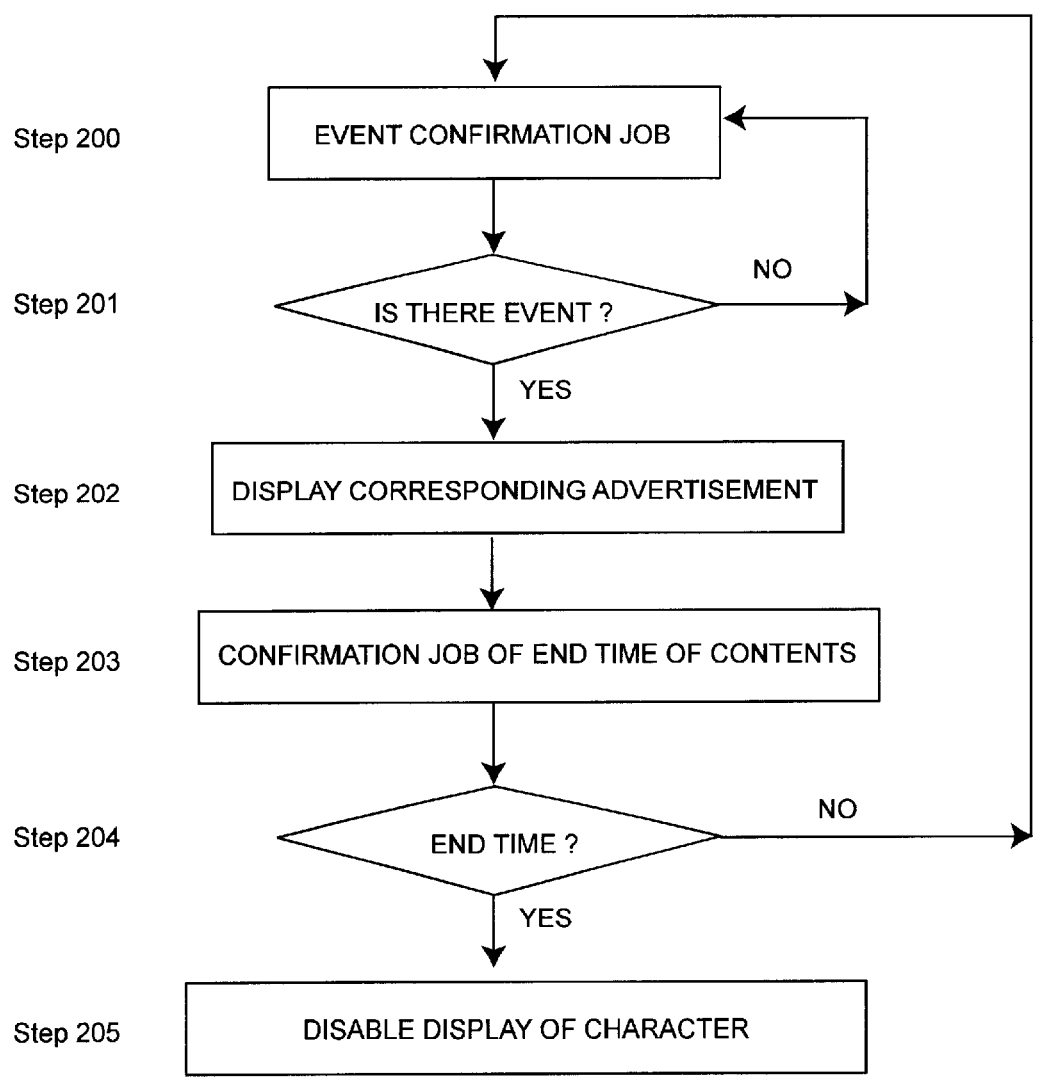
FIG. 5 is a flowchart for explaining operation of this embodiment.

FIG. 5 is a flowchart showing operation of an advertisement display.

Figure 6:
FIG. 6 is an example of a display of an advertisement which is displayed on a desktop.
Figure 7:
FIG. 7 is an example of a display of an advertisement which is displayed on a desktop.

First, the tuner tries to confirm an event described in the schedule file every predetermined period of time, for example every one minute (Step 200). And, if time is for an event described in a CM (commercial) tag of the schedule file (Step 201), a corresponding advertisement data is read, and an advertisement is displayed on an image plane for a predetermined period of time (Step 202). For example, referring to an example of FIG. 4, an advertisement is displayed from 08:00 in the morning to 08:01 in the morning on Sep. 24, 1998, based on an advertisement data described in the schedule file. The CM tag of the schedule file signifies "2. Start time and end time of blowing display" of the content block as shown in FIG. 4. FIG. 6 and FIG. 7 are examples of a display of an advertisement which is displayed on a desktop.

Successively, end time of final contents described in a default tag is confirmed (Step 203), and if the end time is passed over, it is determined that an effective term of this schedule file has expired, and a display of a character is disabled (Step 204).

Figure 8:
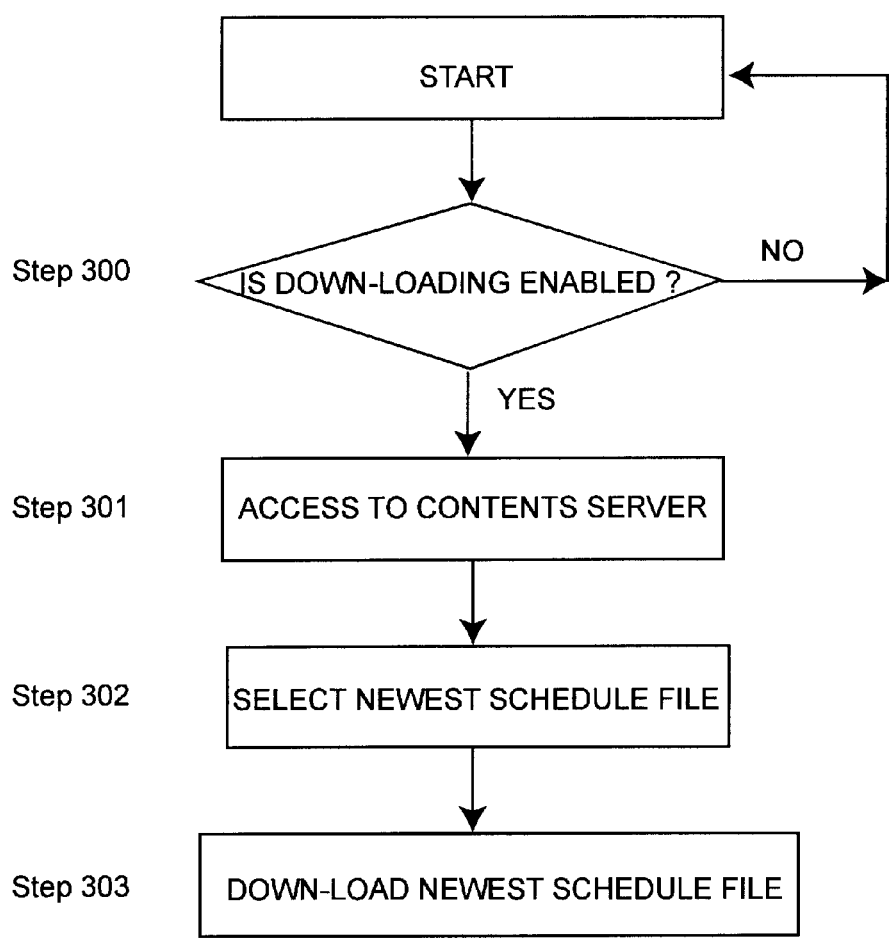
FIG. 8 is a flowchart for explaining updating of a schedule file.

Next, the updating of the schedule file will be explained. FIG. 8 is a flowchart for explaining the updating of the schedule file.

First, the tuner determines whether or not there is an environment in which the terminal device 1 can down-load a new schedule file every predetermined period of time (Step 300). In other-words, it is determined whether the terminal device 1 is connected to an internet. And, in case that the down-loading can be conducted, the tuner has access to the contents server 3 being stored (Step 301).

In the contents server 3, the newest schedule file is selected (Step 302). And, the tuner down-loads the newest schedule file and stores it (Step 303).

The above-mentioned updating of the schedule file is conducted at a background when the terminal device 1 is connected to an internet.

Figure 9:
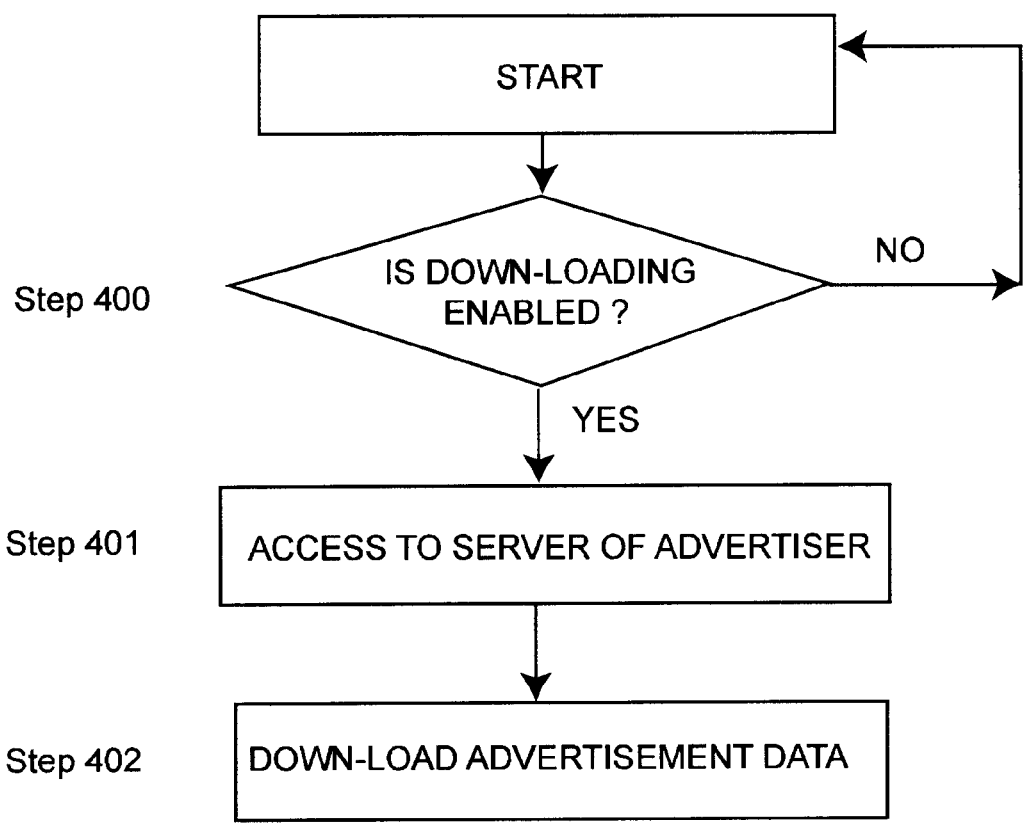
FIG. 9 is a flowchart for explaining updating of an advertisement data.

Finally, the updating of an advertisement data will be explained. FIG. 9 is a flowchart for explaining the updating of the advertisement data.

First, the tuner determines whether or not there is an environment in which the terminal device 1 can down-load a new advertisement data every predetermined period of time (Step 400). In other words, it is determined whether the terminal device 1 is connected to an internet. And, in case that the down-loading can be conducted, the tuner has access to the server 4 being described in the schedule file (Step 401). And, an advertisement data being described in the schedule file is down-loaded and stored (step 402).

The above-mentioned updating of the advertisement data is conducted at a background when the terminal device 1 is connected to an internet.

Next, another embodiment of the present invention will be explained.

Figure 10:
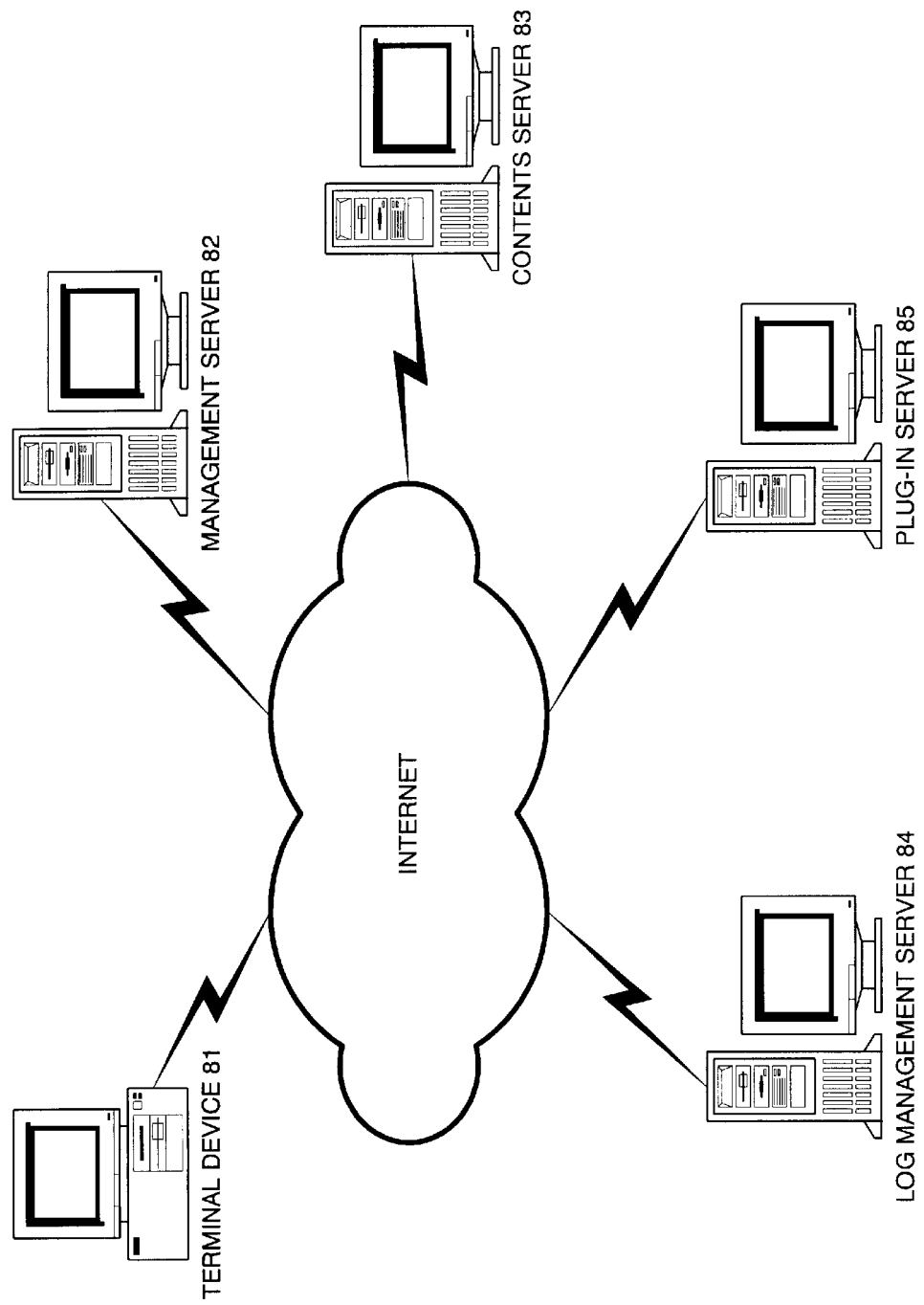
FIG. 10 is a conceptual view of another embodiment.

FIG. 10 is a conceptual view showing a concept of another embodiment of the present invention.

In FIG. 10, 81 is a terminal device of a user. This terminal device 81 is a personal computer, and is constructed of a computer body, a display, a communication modem, a keyboard, a mouse and so forth. Also, in a storage device of the terminal device 81, a system (Windows, MacOS and so forth) for operating the computer, an application (a tuner and so forth which will be mentioned later) necessary for working the present invention, and a plug-in application associated therewith are stored.

82 is a management server. This only one management server 82 exists on a network, and has a character list for managing characters which are presently registered and can be obtained by a user.

83 is a contents server. With regard to this contents server 83, a plurality of contents servers are usually provided, and have a character display data of a character being managed, a schedule file corresponding to the above-described character, and an advertisement data to be displayed based on the above-described schedule file, respectively.

84 is a log management server. This log management server 84 is for stocking a log of a user.

85 is a plug-in server. This plug-in server has various kinds of plug-in applications and a management function, for example a function such as a mail server.

86 is an internet, and the terminal device 81, the management server 82, the contents server 83, the log management server 84 and the plug-in server 85 are connected to this internet 86, and it becomes to be possible to conduct transmission and reception of a data therebetween.

Figure 11:
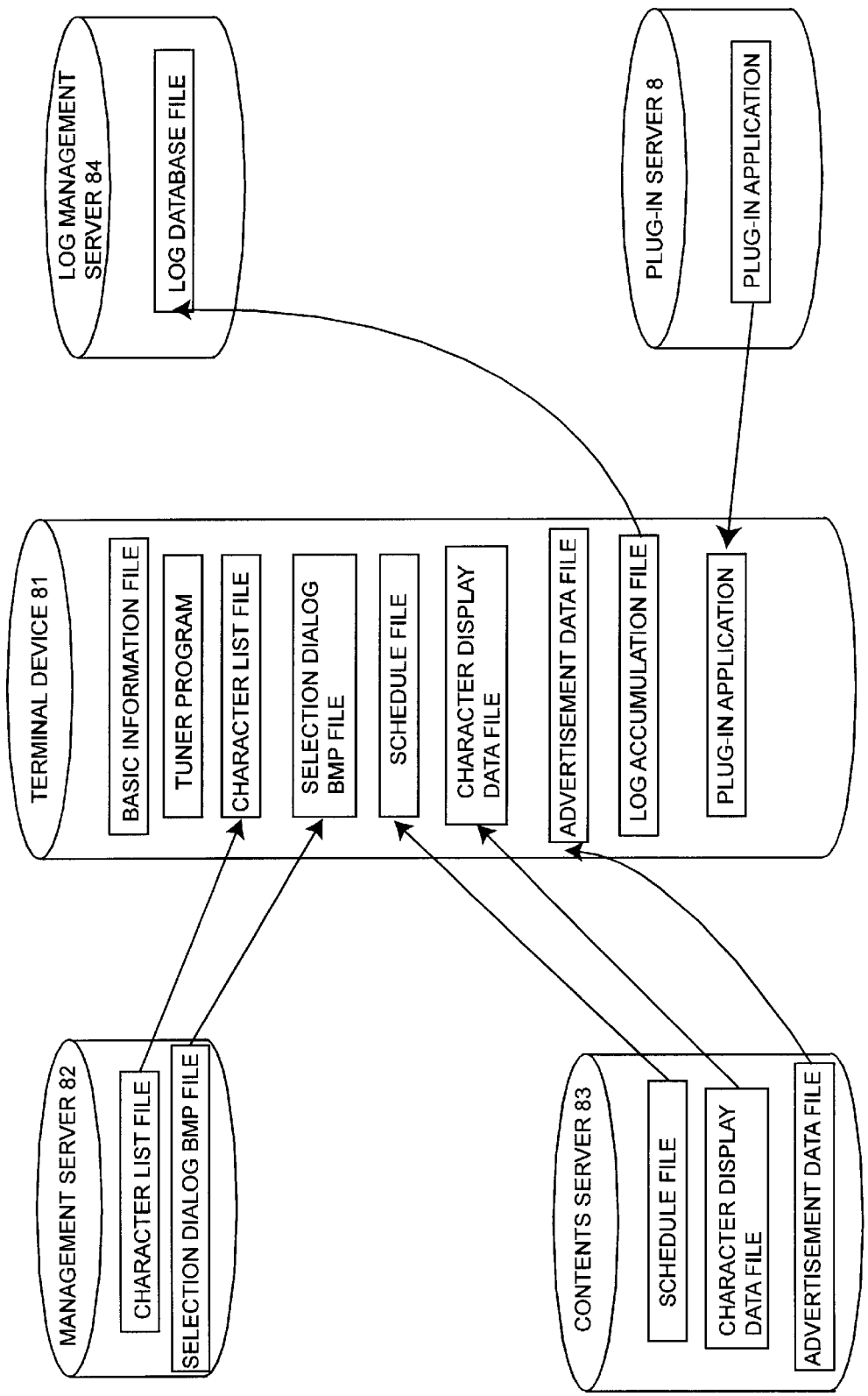
FIG. 11 is a conceptual view with respect to a file of each apparatus in another embodiment.

Successively, an arrangement of each device and a file in each device will be explained using FIG. 11.

First, the management server 82 will be explained.

In the management server 82, a character list file that is a file of a list of presently available characters is stored. And, when character selection is selected, under condition of an on-line, all tuners certainly has access to the character list file, and refer to the list. In this character list file, a list of presently available characters and an address of the contents server in which a character display data of each character is stored are described. Furthermore, the management server 82 stores, in addition to the character list file, a BMP (bit map) file for a selection dialog, which is used for displaying in the selection dialog each character listed in the character list file. It is noted that the number of BMP files for a selection dialog corresponds to the number of the characters listed in the character list file.

Successively, the contents server 83 will be explained.

The contents server 83 stores a schedule file prepared for every character, a character display data file that is a file including character ID for distinguishing a character display data from a character, and an advertisement data file that is a file of information to be transmitted, such as a text, and a background image and voice of blowing. It is noted that description contents of the schedule file are as mentioned above.

In the log management server 84, a log database file is stored, and log information successively transmitted from the terminal device 1 is accumulated.

In the plug-in server 85, programs of various plug-in applications are stored.

Finally, the terminal device 1 will be mentioned.

By means of installation of the tuner, in a storage device of the terminal device 1, a basic information file and a main body of a tuner program are created. The basic information file describes an address of the management server 82, user ID that will be mentioned later, and locations and so forth of a schedule file of a down-loaded character and a file of a character display data.

Also, in a storage device of the terminal device 1, a character list file and a BMP file for a selection dialog, which have been down-loaded from the management server 82, are stored. A schedule file, a character display data file and an advertisement data file, which have been down-loaded from the contents server 83, are stored. A file of the plug-in application, which has been down-loaded from the plug-in server 85, is also stored.

Also, a log file for accumulating a log of an advertisement that a user has seen is also created.

Figure 12:
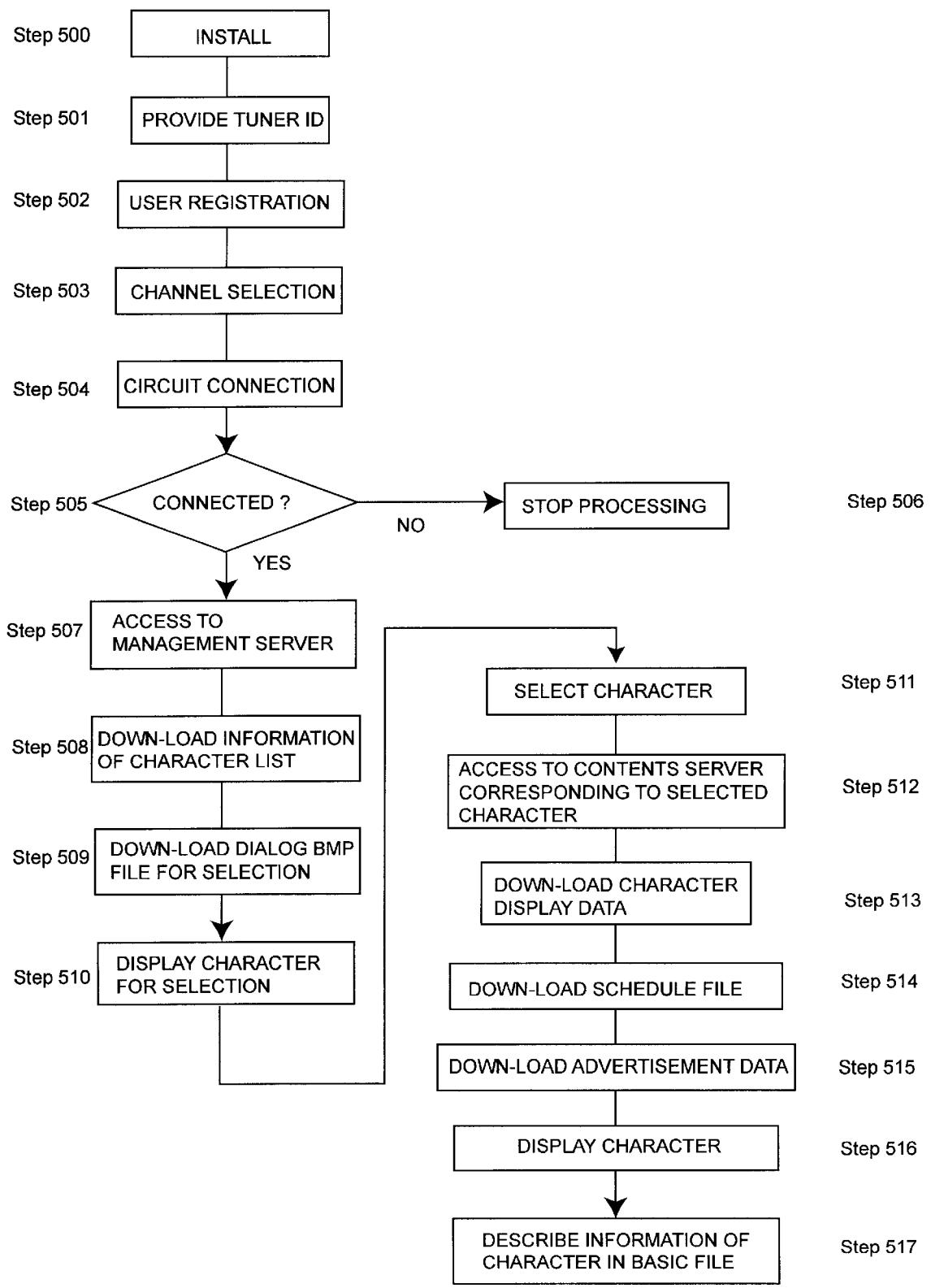
FIG. 12 is a flowchart for explaining operation of another embodiment.
Figure 13:
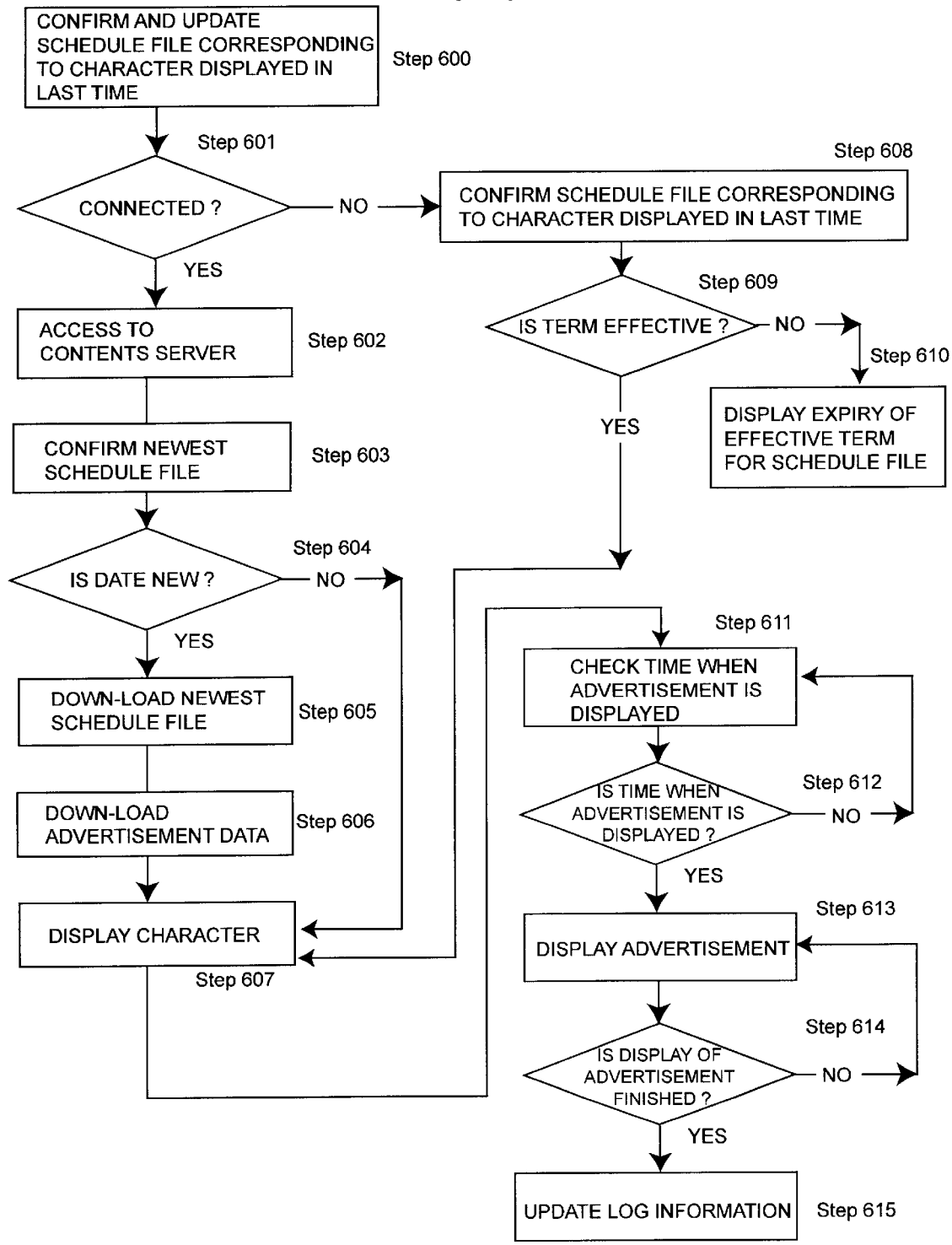
FIG. 13 is a flowchart for explaining operation of another embodiment.
Figure 14:
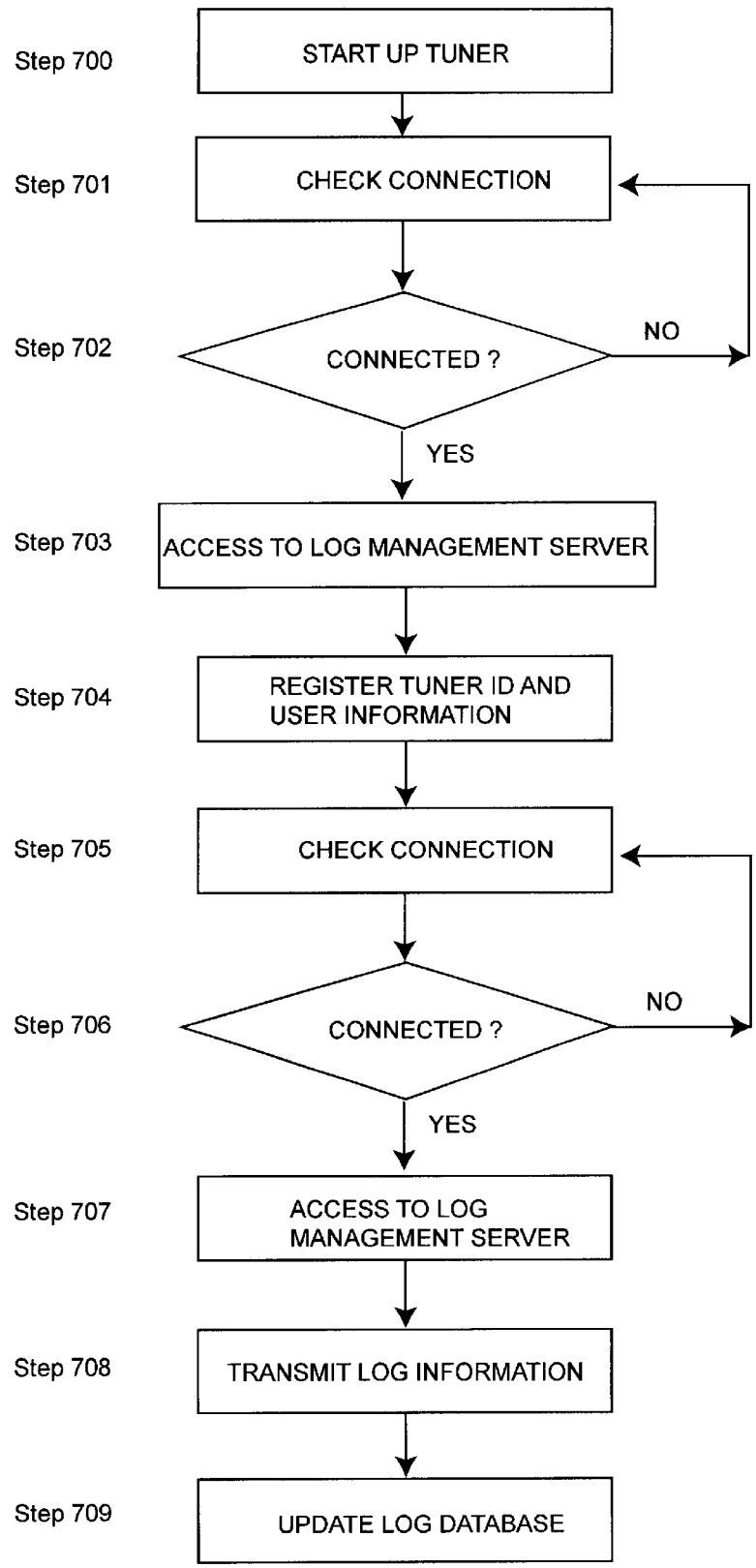
FIG. 14 is a flowchart for explaining operation of another embodiment.

In the above-described arrangement, operation will be explained using FIG. 12, FIG. 13 and FIG. 14.

First, operation of a tuner during installation will be explained.

When the tuner is installed in the terminal device 1 (Step 500), tuner ID is described in the basic information file (Step 501). A number peculiar to each terminal device is added to this tuner ID. And, the tuner ID is registered in the log management server 85 in a form which is related to user information that will be mentioned later. A database of them is created in the log management server 85, and is stored in the log database file. And, the log database file is used in a manner that it is automatically managed by a password when plug-in in which a network is utilized is utilized, and in addition, the log database is used for understanding a version and the number of the tuners.

When the tuner is installed and started up, a user registration by a user is conducted (Step 502). This user registration is reflected in a log data of the log management server 84. It is noted that the contents of the user registration are "family name", "first name", "E-Mail address", "the date of one's birth", "sex distinction", "prefectures" and "place of use", for example.

Successively, a job for selecting a character to be displayed starts (Step 503). Here, channel selection is conducted when a character to be displayed is selected, and as a method of selecting the character, for example, a pop-up menu is utilized, and [channel selection] is selected. When the channel selection is selected, first the tuner is connected to a circuit, and tries to have access to the management server 82 (Steps 504 and 505). As a result of trying to connecting it to the circuit, in case that the connection cannot be made, this is displayed and processing stops (Step 506).

If the tuner can have access to the management server 82 (Step 507), first the tuner refers to the character list file, and confirms a presently available character. If there is an available character, a character list (address information and so forth of the contents server in which a schedule file and a character display data of the character are stored) of the character is down-loaded (Step 508). Also, the BMP file for a selection dialog of the character is down-loaded (Step 509).

When acquisition of these data is completed, the character is displayed based on the BMP file for the selection dialog (Step 510). When a desired character is selected (Step 511), the tuner has access to the acquired address of the contents server in order to down-load a complete set of a character display data for displaying the character itself and information that is presently added to this character (Step 512).

When the access to the contents server is made, first the character display data is down-loaded (Step 513). In addition, in case that the character display data is already hold, if a data of the server is newer compared with time of the file, the data is down-loaded.

Successively, a schedule file of the character is down-loaded (Step 514). And finally, an advertisement data is down-loaded, which includes a message (a text and a bit map data and so forth used for blowing) such as a presently scheduled advertisement (Step 515).

And, when everything above is prepared, the character is displayed (Step 516).

At the end of the display of the character, information of the character which was finally displayed is described in a basic file (Step 517).

Successively, operation during start-up at and after the second time will be explained.

First, when the tuner is started up, before a display of a character, confirmation and updating of a schedule file are conducted (Step 600). With regard to the confirmation and updating of this schedule file, first it is determined whether the tuner is connected to a network during the start-up (Step 601).

If connected, the tuner has access to the contents server described in the basic information file (Step 602), and confirms the newest schedule file of the character (Step 603), and if there is a schedule file which has a new date, it is down-loaded (Steps 604 and 605). At this time, an advertisement data corresponding to the schedule file is down-loaded (Step 606). And, the character is displayed (Step 607).

On the other hand, if not connected to the network during the start-up, the tuner confirms a schedule file corresponding to a character that was finished at the last time, which is described in the basic information file (Steps 608 and 609). At this time, based on the schedule file, in case that a term of character use expires, a comment for notifying that is displayed without displaying the character (Step 610). Based on the schedule file, in case that a term of character use is effective, the character is displayed (Step 607).

Next, the tuner periodically confirms whether or not time is when an event described in the schedule file should occur (every one minute, for example) (Steps 611 and 612).

And, in case that time when the event occurs is confirmed, the tuner displays an advertisement on a desktop based on an advertisement data in which blowing and so forth are contained in accordance with the definition of the schedule file, and also, reproduces a designated action (Step 613).

In accordance with time which is written in the schedule file, when the time reaches time when the display stops, the display is finished (Steps 614 and 615).

When the display of information is finished, a kind of the advertisement and a period of display time and so forth are written in a log file as a log (Step 616).

Also, when the tuner is started up in an off-line (disconnection) and the off-line is halfway changed to an on-line, a check of the date of the schedule file is conducted. With regard to a check of an on-line or off-line, a situation of the connection is confirmed every predetermined period of time on a side of the tuner, for example at periodic timing such as every ten minutes.

Furthermore, in the middle of using a certain character, in case of switching it to other character by means of "channel selection", operation same as the above-mentioned "channel selection" is conducted.

Successively, up-loading of log information will be explained.

First, when the tuner is started up (Step 700), it is determined whether or not it is connected to a network (Steps 701 and 702).

If connected, the tuner has access to the log management server 84, and transmits the tuner ID which was added during the installation and the registered user information (Step 703).

In the log management server 84, the tuner ID and the registered user information are described in the log database file, which are associated with each other (Step 704).

Thereafter, in the terminal device 1, the log accumulation file is successively updated. Then, it is determined whether or not the tuner is connected to the network every fixed period of time (every one hour, for example) (Steps 705 and 706). If connected, the tuner has access to the log management server 84 (Step 707), and transmits the updated log accumulation file together with the tuner ID (Step 708).

In the log management server 84, log accumulation information which has been sent to a data of a user part corresponding to the tuner ID is described, and the log database is updated (Step 709).

Accordingly, the log information of a user is always accumulated in the log database, and it is possible to understand which characters are displayed by a user and which advertisements are seen by the user.

As other embodiment different from the embodiments as explained above, an embodiment below can be considered.

First, it can be considered that the tuner is down-loaded from the management server.

Furthermore, by clicking a character displayed on a desktop of the terminal device, it is also possible to have access to a homepage (web) of an advertiser.

INDUSTRIAL APPLICABILITY

As mentioned above, the information providing system related to the present invention is information providing technology capable of displaying information such as a character and an advertisement on an image plane of a computer, and of always updating the information to new information.

Therefore, the information providing system is appropriate for a field in which an advertisement is provided to a user who is utilizing a communication network.

What is claimed is:

1. An information providing system having a first server, a second server, a third server, a terminal, and a communication circuit connecting each of said servers with the terminal, characterized in that said first server has storage means for storing a list of data of characters which a user can obtain, and a server address at which a character display data for displaying said characters is stored, and means for conducting communication with each other through said terminal and said communication circuit, said second server has storage means for storing said character display data and a schedule file for managing information in relation to the characters, and means for conducting communication with each other through said terminal and said communication circuit, said third server has storage means for storing a data of information in relation to said characters, and means for conducting communication with each other through said terminal and said communication circuit, and said terminal has means for communicating with said first server, second server and third server, means for down-loading said list of data from said first server and displaying a list of the characters that can be obtained, means for down-loading an address of the second server in which the character display data of a character selected from said first server is stored by selecting an arbitrary character from said list of the characters, means for down-loading said character display data and the schedule file corresponding to these characters from said second server, based on the address of said second server, means for down-loading an information data described in said schedule file from said third server, means for displaying characters on a desktop based on the down-loaded character display data, and means for providing information by means of the down-loaded information data based on a schedule described in said schedule file.

2. An information providing system recited in claim 1, characterized in that said information data is an advertisement data for providing an advertisement.

3. An information providing system recited in claim 1 or claim 2, characterized in that said terminal has means for down-loading a new schedule file from said second server when communication can be conducted, and updating the schedule file.

4. An information providing system recited in claim 1, characterized in that said terminal has means for down-loading a new information data from said third server when communication can be conducted, and updating the information data.

5. An information providing system recited in claim 1, characterized in that said terminal has means for setting an effective term for said schedule file, and disabling a display of said characters in case that said effective term is passed over.

6. An information providing system recited in claim 1, wherein displaying said characters and providing said information on said desktop occur without interrupting normal operation of said terminal.

7. An information providing system recited in claim 1, wherein said terminal is capable of being use normally when said characters are displayed and said information is provided on said desktop.

8. An information providing system recited in claim 1, wherein said schedule defines specific points in time when said information is desired to be provided.

9. An information providing system recited in claim 1, wherein said information is provided on said desktop for a predetermined period of time.

10. An information providing system recited in claim 1, wherein said arbitrary character is selected by a user based on user preferences.

11. An information providing system recited in claim 1, wherein selecting a character displayed on said desktop with an input device enables access to a homepage of an advertiser.

12. An information providing system having a first server, a second server, a third server, a terminal, and a communication circuit connecting each of said servers with the terminal, characterized in that said first server has storage means for storing a list of data of characters which a user can obtain, and a server address at which a character display data for displaying said characters is stored, and means for conducting communication with each other through said terminal and said communication circuit, said second server has storage means for storing said character display data, a schedule file for managing information in relation to the characters, and a data of information in relation to said characters, and means for conducting communication with each other through said terminal and said communication circuit, said terminal has means for communicating with said first server, second server and third server, means for down-loading said list of data from said first server and displaying a list of the characters that can be obtained, means for, by selecting an arbitrary character from said list of the characters, down-loading an address of the second server from said first server, in which the character display data of the selected character is stored, means for down-loading said character display data, the schedule file corresponding to these characters and the data of the information in relation to said characters from said second server, based on the address of said second server, means for displaying characters on a desktop based on the down-loaded character display data, means for providing information of the down-loaded information data based on a schedule described in said schedule file, means for recording information provided in said information, and means for transmitting said provided information record to said third server, and said third server has means for conducting communication with each other through said terminal and said communication circuit, storage means for storing the provided information record, and means for storing the provided information record in said storage means, which has been transmitted, in association with the terminal that transmitted it.

13. An information providing system recited in claim 12, characterized in that said information data is an advertisement data for providing an advertisement.

14. An information providing system recited in claim 12 or claim 13, characterized in that said terminal has means for down-loading a new schedule file and information in relation to said characters from said second server when communication can be conducted, and updating the schedule file and the information in relation to said characters.

15. An information providing system recited in claim 12, characterized in that said terminal has means for setting an effective term for said schedule file, and disabling a display of said characters in case that said effective term is passed over.

16. An information providing system recited in claim 12, characterized in that a fourth server is provided, which has means for communicating with each other through said terminal and said communication circuit, and storage means for storing a plurality of applications, and said terminal further has means for having access to said fourth server and down-loading the stored applications.

17. An information providing system recited in claim 16, wherein displaying said characters and providing said information on said desktop occur without interrupting normal operation of said terminal.

18. An information providing system recited in claim 12, wherein said terminal is capable of being use normally when said characters are displayed and said information is provided on said desktop.

19. An information providing system recited in claim 12, wherein said schedule defines specific points in time when said information is desired to be provided.

20. An information providing system recited in claim 12, wherein said information is provided on said desktop for a predetermined period of time.

21. An information providing system recited in claim 12, wherein said arbitrary character is selected by a user based on user preferences.

22. An information providing system recited in claim 12, wherein selecting a character displayed on said desktop with an input device enables access to a homepage of an advertiser.

23. An information providing method in a network comprising at least a first server, a second server, a third server, a terminal, and a communication circuit connecting each of said servers with the terminal, characterized in that the method has steps of:

storing in said first server a list of data of characters which a user can obtain, and a server address at which a character display data for displaying said characters is stored;

storing in said second server said character display data and a schedule file for managing information in relation to the characters;

storing in said third server a data of information in relation to said characters;

having access to said first server from said terminal, and down-loading said list of data and displaying a list of characters on the terminal;

selecting an arbitrary character from the displayed list, and transmitting a data indicating the selected character to said first server;

receiving said data at said first server, and transmitting an address of the second server in which a character display data of the selected character to said terminal;

down-loading said character display data and the schedule file corresponding to this character from said second server, based on said address at said terminal;

down-loading an information data described in said schedule file from said third server at said terminal;

displaying characters on a desktop based on the down-loaded character display data at said terminal; and providing information of the down-loaded information data based on a schedule described in said schedule file at said terminal.

24. An information providing method recited in claim 23, characterized in that said information data is an advertisement data for providing an advertisement.

25. An information providing method recited in claim 23 or claim 24, characterized in that the method has a step of, at said terminal, down-loading a new schedule file from said second server when communication can be conducted, and updating the schedule file.

26. An information providing method recited in claim 23, characterized in that the method has a step of, at said terminal, down-loading a new information data from said third server when communication can be conducted, and updating the information data.

27. An information providing method recited in claim 23, characterized in that an effective term is set for said schedule file, and the method has a step of, at said terminal, disabling a display of said characters in case that the effective term for the schedule file is passed over.

28. An information providing method recited in claim 23, wherein displaying said characters and providing said information on said desktop occur without interrupting normal operation of said terminal.

29. An information providing method recited in claim 23, wherein said terminal is capable of being use normally when said characters are displayed and said information is provided on said desktop.

30. An information providing method recited in claim 23, wherein said schedule defines specific points in time when said information is desired to be provided.

31. An information providing method recited in claim 23, wherein said information is provided on said desktop for a predetermined period of time.

32. An information providing method recited in claim 28, wherein said arbitrary character is selected by a user based on user preferences.

33. An information providing method recited in claim 23, wherein selecting a character displayed on said desktop with an input device enables access to a homepage of an advertiser.

* * * * *